United States Patent
Bos et al.

(10) Patent No.: US 11,586,989 B2
(45) Date of Patent: Feb. 21, 2023

(54) METHOD FOR DETECTING IF A MACHINE LEARNING MODEL HAS BEEN COPIED USING INTERMEDIATE OUTPUTS OF THE MACHINE LEARNING MODEL

(71) Applicant: NXP B.V., Eindhoven (NL)

(72) Inventors: Joppe Willem Bos, Wijgmaal (BE); Simon Johann Friedberger, Heverlee (BE); Nikita Veshchikov, Brussels (BE); Christine Van Vredendaal, Eindhoven (NL)

(73) Assignee: NXP B.V., Eindhoven (NL)

( * ) Notice: Subject to any disclaimer, the term of this patent is extended or adjusted under 35 U.S.C. 154(b) by 840 days.

(21) Appl. No.: 16/511,082

(22) Filed: Jul. 15, 2019

(65) Prior Publication Data
US 2021/0019661 A1    Jan. 21, 2021

(51) Int. Cl.
*G06N 20/00* (2019.01)
*G06N 20/20* (2019.01)
*G06N 3/08* (2023.01)

(52) U.S. Cl.
CPC .............. *G06N 20/20* (2019.01); *G06N 3/08* (2013.01)

(58) Field of Classification Search
CPC .......... G06N 20/00; G06N 20/20; G06N 3/08; G06N 3/0454; G06F 21/554; G06F 7/582
See application file for complete search history.

(56) References Cited

U.S. PATENT DOCUMENTS

| | | | |
|---|---|---|---|
| 2017/0206449 A1* | 7/2017 | Lain | G06N 3/02 |
| 2019/0087603 A1* | 3/2019 | Dror | G16H 10/60 |
| 2019/0251295 A1* | 8/2019 | Vieyra | G06F 3/067 |

(Continued)

FOREIGN PATENT DOCUMENTS

| | | |
|---|---|---|
| CN | 104680473 A | 6/2015 |
| CN | 106651805 A | 5/2017 |

(Continued)

OTHER PUBLICATIONS

Abadi, Martin et al.; "TensorFlow: Large-scale Machine Learning on Heterogeneous Systems;" Preliminary White Paper, Nov. 9, 2015; software available from tensorflow.org. https://www.tensorflow.org/.

(Continued)

*Primary Examiner* — Pakee Fang
(74) *Attorney, Agent, or Firm* — Daniel D. Hill

(57) ABSTRACT

A method is provided for detecting copying of a machine learning model. In the method, the first machine learning model is divided into a plurality of portions. Intermediate outputs from a hidden layer of a selected one of the plurality of portions is compared to corresponding outputs from a second machine learning model to detect the copying. Alternately, a first seal may be generated using the plurality of inputs and the intermediate outputs from nodes of the selected portion. A second seal from a suspected copy that has been generated the same way is compared to the first seal to detect the copying. If the first and second seals are the same, then there is a high likelihood that the suspected copy is an actual copy. By using the method, only the intermediate outputs of the machine learning model outputs have to be disclosed to others, thus protecting the confidentiality of the model.

20 Claims, 6 Drawing Sheets

(56) References Cited

U.S. PATENT DOCUMENTS

| | | | |
|---|---|---|---|
| 2019/0294959 A1* | 9/2019 | Vantrease | G06N 3/08 |
| 2020/0186361 A1* | 6/2020 | Almgren | H04L 9/30 |

FOREIGN PATENT DOCUMENTS

| | | | |
|---|---|---|---|
| CN | 107194863 A | 9/2017 | |
| JP | 5889727 B2 * | 3/2016 | |
| WO | WO-2010100398 A1 | 9/2010 | |
| WO | 2016043734 A1 | 3/2016 | |
| WO | 2018216379 A1 | 11/2018 | |

OTHER PUBLICATIONS

Adelsbach, Andre et al.; "Proving Ownership of Digital Content;" 3rd International Workshop on Information Hiding, IH 1999 LNCS, A. Pfitzmann, Ed., vol. 1768; Springer 1999; pp. 117-133; DOI:10.1007/10719724_9.

Adi, Yossi et al.; "Turning Your Weakness Into a Strength: Watermarking Deep Neural Networks By Backdooring;" 27th USENIX Security Symposium, Aug. 15-17, 2018, Baltimore, Maryland; pp. 1615-1631; https://www.usenix.org/conference/usenixsecurity18/presentation/adi.

Athalye, Anish et al.; "Synthesizing Robust Adversarial Examples;" Jul. 24, 2017; CoRR, vol. abs/1707.07397, 2017; http://arxiv.org/abs/1707.07397.

Brassard, Gilles et al.; "Minimum Disclosure Proofs of Knowledge;" Journal of Computer and System Sciences, vol. 37, No. 2, pp. 156-189, 1988; https://doi.org/10.1016/0022-0000(88)90005-0.

Correia-Silva, Jacson Rodrigues, et al.; "Copycat CNN: Stealing Knowledge by Persuading Confession With Random Non-Labeled Data;" Conference on Neural Networks—IJCNN; IEEE, Jul. 8-Jul. 13, 2018, Rio, Brazil; pp. 1-8; https://doi.org/10.1109/IJCNN.2018.8489592.

Cox, Ingemar J. et al.; "The First 50 Years of Electronic Watermarking;" EURASIP Journal on Applied Signal Processing; Dec. 2002; vol. 2002, No. 2; pp. 126-132; DOI: 10.1155/S1110865702000525.

Guo, Jia et al.; "Watermarking Deep Neural Networks For Embedded Systems," Computer-Aided Design—ICCAD, Nov. 5-8, 2018, San Diego, CA; ACM, pp. 133:1-133:8; doi.org/10.1145/3240765.3240862.

Hamming, R. W.; "Error Detecting and Error Correcting Codes;" Bell System Technical Journal, vol. 29, No. 2, pp. 147-160; Apr. 1950.

Hopper, Nicholas et al.; "From Weak to Strong Watermarking;" Theory of Cryptography—TCC 2007, ser. Lecture Notes in Computer Science, S.P. Vadhan, Ed., vol. 4392 2007; pp. 362-382; DOI:10.1007/978-3-540-70936-7_20.

Khan, Asifullah et al.; "Machine Learning Based Adaptive Watermark Decoding in View of Anticipated Attack;" Pattern Recognition 41(8):2594-2610 Aug. 2008; DOI: 10.1016/j.patcog.2008.01.007.

Kirbiz, Serap et al "Robust Audio Watermark Decoding By Supervised Learning;" 2006 IEEE International Conference on Acoustics Speech and Signal Processing Proceedings; May 14-19, 2006; Toulouse, France; DOI: 10.1109/ICASSP.2006.1661387.

Krizhevsky, Alex; "High-Performance C++/CUDA Implementation of Convolutional Neural Networks;" https://code.google.com/archive/p/cuda-convnet; downloaded from the Internet Jan. 15, 2019.

Krizhevsky, Alex; "Learning Multiple Layers of Features From Tiny Images;" Master's thesis, Department of Computer Science, University of Toronto, 2009.

Le Merrer, et al.; "Adversarial Frontier Stitching for Remote Neural Network Watermarking," CoRR, vol. abs/1711.01894, Nov. 6, 2017; http://arxiv.org/abs/1711.01894.

Lin, Tsung-Yi et al.; "Microsoft COCO: Common Objects In Context;" Computer Vision—ECCV, ser. LNCS, D. J. Fleet, T. Pajdla, B. Schiele, and T. Tuytelaars, Eds., vol. 8693. Springer, 2014, pp. 740-755.

Madry, Aleksander et al.; "Towards Deep Learning Models Resistant to Adversarial Attacks;" arXiv preprint arXiv:1706.06083, Nov. 9, 2017.

Nagai, Yuki et al.; "Digital Watermarking for Deep Neural Networks," IJMIR, vol. 7, No. 1, pp. 3-16, Feb. 6, 2018; https://doi.org/10.1007/s13735-018-0147-1.

Papernot, Nicolas et al.; "Practical Black-Box Attacks Against Machine Learning," Asia Conference on Computer and Communications Security—AsiaCCS, ACM, Mar. 19, 2017, pp. 506-519; https://doi.org/10.1145/3052973.3053009.

Peng, Hong et al.; "Image Watermarking Method in Multiwavelet Domain Based on Support Vector Machines".The Journal of Systems and Software 83 (Accepted Mar. 1, 2010) 1470-1477; doi>10.1016/j.jss.2010.03.006.

Quiring, Erwin et al.; "Forgotten Siblings: Unifying Attacks on Machine Learning and Digital Watermarking;" IEEE European Symposium on Security and Privacy, Euro S&P. IEEE, 2018, pp. 488-502. https://doi.org/10.1109/EuroSP.2018.00041.

Rebuffi, Sylvestre-Alvise et al.; "Learning Multiple Visual Domains With Residual Adapters;" in Neural Information Processing Systems, I. Guyon, U. von Luxburg, S. Bengio, H. M. Wallach, R. Fergus, S. V. N. Vishwanathan, and R. Garnett, Eds., 2017, pp. 506-516; http://papers.nips.cc/paper/6654-learning-multiple-visual-domains-with-residual-adapters.

Rosenblatt, Bill; "Dot Blockchain Media Makes Blockchain Plus Watermarking a Reality;" Copyright and Technology; NYC 2019 Conference Whitepapers/Presentations; Jan. 24, 2018.

Rouhani, Bita Darvish et al.; "Deepsigns: A Generic Watermarking Framework for Protecting the Ownership of Deep Learning Models;" Cryptology ePrint Archive, Report 2018/311, 2018; https://eprint.iacr.org/2018/311.

Samuel, A. L. et al; "Some Studies in Machine Learning Using the Game of Checkers;" IBM Journal of Research and Development; vol. 3, No. 3; Jul. 1959; DOI: 10.1147/rd.441.0206.

Shannon, C. E.; "A Mathematical Theory of Communication;" Bell System Technical Journal, vol. 27, pp. 379-423, 623-656, July, Oct. 1948.

Sharif, Mahmood et al.; "Accessorize to a Crime: Real and Stealthy Attacks on State-of-the-Art Face Recognition;" Conference on Computer and Communications Security—CCS, Oct. 24-28, 2016, Vienna, Austria; E. R. Weippl, S. Katzenbeisser, C. Kruegel, A. C. Myers, and S. Halevi, Eds. ACM, pp. 1528-1540; https://doi.org/10.1145/2976749.2978392.

Song, Congzheng et al.; "Machine Learning Models that Remember Too Much;" CCS '17 Proceedings of the 2017 ACM SIGSAC Conference on Computer and Communications Security; pp. 587-601, Dallas, TX, Oct. 30-Nov. 3, 2017; doi>10.1145/3133956.3134077.

Szegedy, Christian et al.; "Intriguing Properties of Neural Networks," CoRR, vol. abs/1312.6199, Submitted Dec. 21, 2013. http://arxiv.org/abs/1312.6199.

Torralba, Antonio et al.; "80 Million Tiny Images: A Large Data Set For Nonparametric Object and Scene Recognition;" IEEE Transactions on Pattern Analysis and Machine Intelligence, vol. 30, No. 11, pp. 1958-1970, Nov. 2008.

Tramer, Florian et al.; "Stealing Machine Learning Models Via Prediction APIs;" 25th USENIX Security Symposium, Aug. 10-12, 2016, pp. 601-618, Austin, Texas; https://www.usenix.org/conference/usenixsecurity16/technical-sessions/presentation/tramer.

Uchida, Yusuke et al.; "Embedding Watermarks Into Deep Neural Networks;" ACM on International Conference on Multimedia Retrieval—ICMR, B. Ionescu, N. Sebe, J. Feng, M. Larson, R. Lienhart, and C. Snoek, Eds. ACM, Apr. 20, 2017, pp. 269-277; https://doi.org/10.1145/3078971.3078974.

van den OORD, Aaron et al.; "Pixel Recurrent Neural Networks;" International Conference on Machine Learning—ICML, ser. JMLR Workshop and Conference Proceedings, M. Balcan and K. Q. Weinberger, Eds., vol. 48. JMLR.org, Aug. 19, 2016, pp. 1747-1756.

Van Schyndel, R.G. et al; "A Digital Watermark;" Proceedings of 1st International Conference on Image Processing, Nov. 13-16, 1994, Austin, TX; DOI: 10.1109/ICIP.1994.413536.

(56) References Cited

OTHER PUBLICATIONS

Venugopal, Ashish et al; "Watermarking the Outputs of Structured Prediction With an Application in Statistical Machine Translation;" Empirical Methods in Natural Language Processing—EMNLP. ALC, Jul. 27-31, 2011, Edinburgh, Scotland, UK; pp. 1363-1372.

Zhang, Jialong et al.; "Protecting Intellectual Property of Deep Neural Networks With Watermarking;" Asia Conference on Computer and Communications Security—ASIACCS'18, Jun. 4-8, 2018, Incheon, Republic of Korea; pp. 159-172.

Notice of Allowance dated May 25, 2022 for U.S. Appl. No. 16/250,074, 25 Pages.

\* cited by examiner

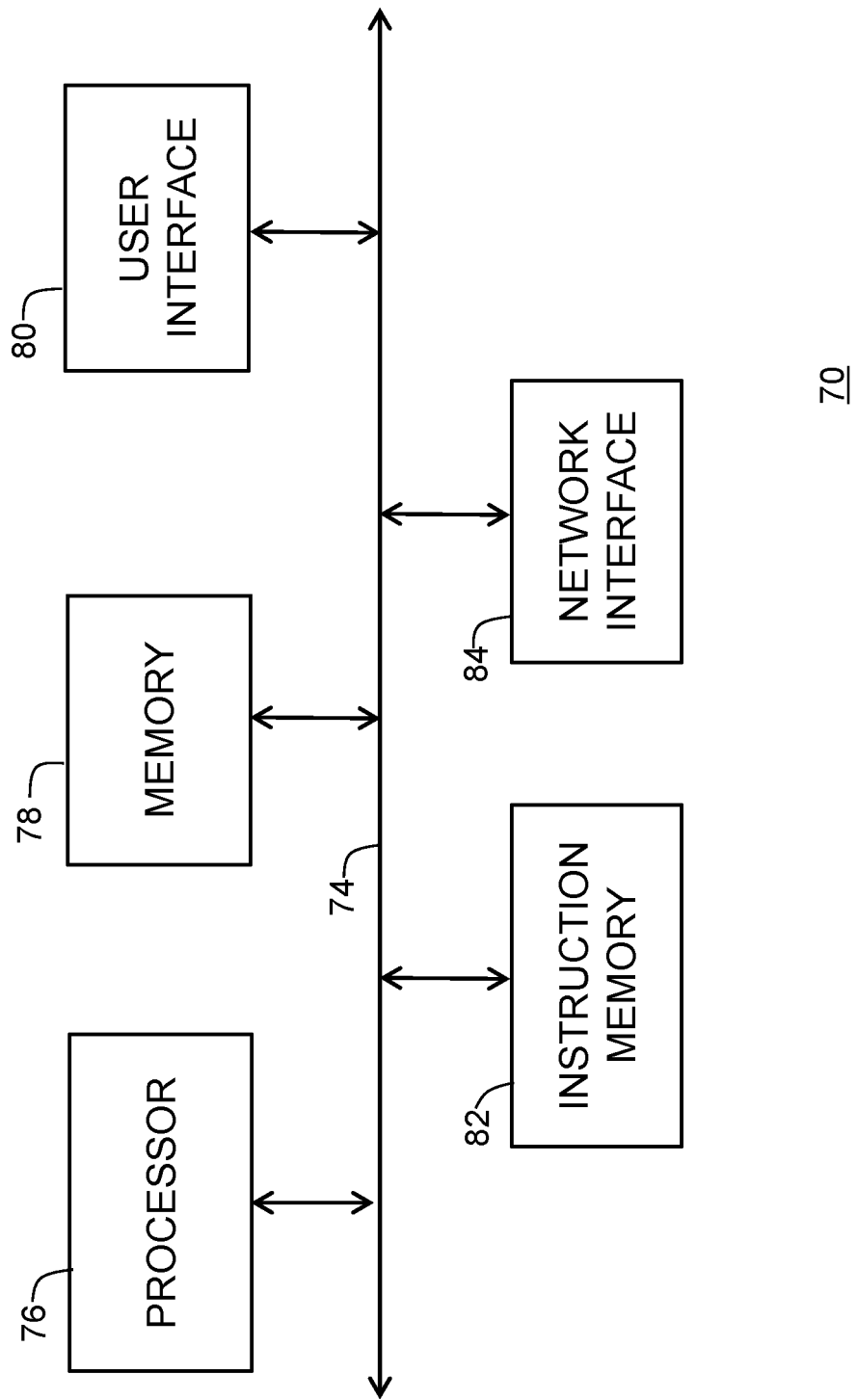

METHOD FOR DETECTING IF A MACHINE LEARNING MODEL HAS BEEN COPIED USING INTERMEDIATE OUTPUTS OF THE MACHINE LEARNING MODEL

RELATED APPLICATION DATA

This application is related to application Ser. No. 16/250, 074, filed on Jan. 17, 2019 to Veshchikov et al., and entitled Method For Determining If A Machine Learning Model Has Been Copied.

BACKGROUND

Field

This disclosure relates generally to machine learning, and more particularly, to a method for detecting if a machine learning model has been copied.

Related Art

Machine learning is becoming more widely used in many of today's applications, such as applications involving forecasting and classification. Generally, a machine learning (ML) model is trained, at least partly, before it is used. Training data is used for training a ML model. Machine learning models may be classified by how they are trained. Supervised learning, unsupervised learning, semi-supervised learning, and reinforcement learning are examples of training techniques. The effectiveness of the ML model is influenced by its accuracy, execution time, storage requirements, and the quality of the training data. The expertise, time, and expense required for creating and training a machine learning model using this training data results in the ML model being a valuable asset.

Protecting a ML model from attacks has become a problem. When machine learning is provided as a service, a user only has access to the inputs and outputs of the model. Model extraction is an attack that results in a near identical copy, also known as a clone or extracted copy, of the machine learning model being produced. To extract the model when the machine learning model is provided as a service, valid queries are provided to the model and the resulting output is compiled. Even when an attacker is just given access to the inputs and outputs, the machine learning model can be relatively easily cloned. Model extraction is described in an article by Tramer et al. entitled "Stealing Machine Learning Models via Prediction APIs," Proceedings of 25th USENIX Security Symposium, 2016, which is herein incorporated by reference in its entirety. Once an attacker has copied or cloned the model, it can be illegitimately used and monetized.

Watermarks are commonly used to mark and prove ownership of a file. Embedding a watermark into a ML model may require the model to be trained with information about the watermark, which may alter the functionality of the model. Also, the watermark needs to be hidden from an attacker. The watermark also needs to be reproducible while being difficult to remove or modify when the ML model is copied. The solutions to these problems can be difficult and costly to effectively implement.

Therefore, a need exists for a method to determine if a machine learning model is an unauthorized copy without at least some of the problems described above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 6 illustrates a data processing system suitable for implementing the machine learning model of FIG. 1.

DETAILED DESCRIPTION

Figure 1:
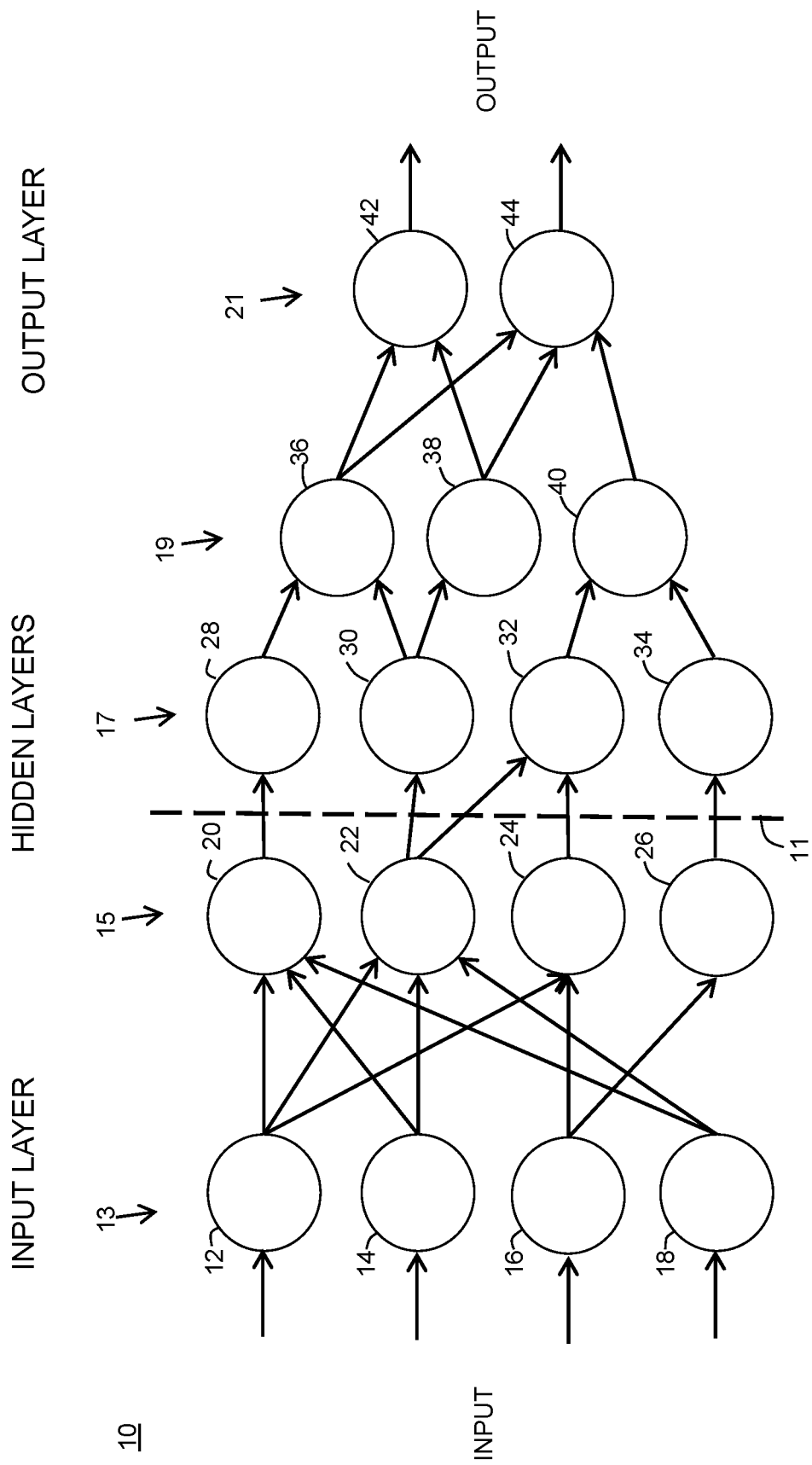
FIG. 1 illustrates a machine learning model in accordance with an embodiment.

A method is provided for detecting a clone or a copy of a ML model. For purposes of this description, a copy of a ML model is an exact copy whereas a clone is not an exact copy that may be produced by the model extraction technique. Because the herein described method can be applied to either a clone or a copy of a ML model, the words clone and copy will be used interchangeably throughout the description.

Generally, the ML model includes a plurality of layers, where each of the layers has a plurality of nodes. A plurality of predetermined inputs is provided to the ML model, and the ML model provides a plurality of outputs in response. In accordance with one embodiment, the plurality of layers of the ML model is divided into multiple portions. One portion is selected. The layers of the suspected copy are divided the same way as the ML model. Intermediate outputs of the layers of the selected portion of the ML model are compared to the outputs of the same selected portion of the suspected copy. Alternately, in one example, one of the portions may be selected to create a seal. The seal is created, if desired, from the predetermined inputs to the selected portion and the resulting outputs of the selected portion. The inputs and outputs of the selected portion are concatenated, and a cryptographic hash function is applied. The seal may include additional information such as the date and time the seal was created. The same inputs are input to the suspected copy. If a seal was created for the original model, a seal is created the same way as the seal of the protected ML model. The two seals are then compared to determine if they are the same. If they are the same, then there is a high likelihood that the suspected copy is an actual copy of the protected ML model. If they are not the same, then the suspected copy may be a clone.

The disclosed method does not require any modification to the protected ML model, thus preserving accuracy of the ML model. Also, because only intermediate outputs from a hidden layer are compared, less of the ML model is made known to others, thus protecting the confidentiality of the ML model. In addition, the method can be applied to various types of ML models and no retraining of the protected ML model is required.

In accordance with an embodiment, there is provided, a method for detecting a copy of a machine learning model, the method including: providing a first machine learning model, wherein the first machine learning model includes a plurality of layers; dividing the first machine learning model into a first plurality of portions; inputting a plurality of inputs into the first machine learning model, a selected portion of the first plurality of portions providing a first plurality of outputs in response; inputting the plurality of inputs into a second machine learning model; comparing the first plurality of outputs of the selected portion of the first machine learning model to a second plurality of outputs from a corresponding selected portion of the second machine learning model; and determining if the first plurality of outputs and the second plurality of outputs match. The plurality of inputs may be characterized as being a plurality of images, music, text, or a video. The method may further include: generating a first seal using the plurality of inputs and the first plurality of outputs; generating a second seal using the second plurality of inputs and the second plurality of outputs; and determining if the first seal and the second seal are the same. The first and second machine learning models may be neural networks. The selected portions of the first and second plurality of portions may each include one or more layers of the plurality of layers. The selected portions of the first and second plurality of portions may each include one or more nodes of one or more layers of the plurality of layers. The method may further include: applying a one-way function to the plurality of inputs and the first plurality of outputs to produce a seal; adding a date and time stamp to the seal; and making the seal unmodifiable. Making the seal unmodifiable may further include inserting the first seal into a blockchain. The first machine learning model may a classification type of machine learning model.

In accordance with another embodiment, there is provided, a method for detecting copying of a machine learning model, the method including: providing a first machine learning model, wherein the first machine learning model includes a plurality of layers, each layer of the plurality of layers includes one or more nodes; dividing the first machine learning model into a first plurality of portions; inputting a plurality of inputs into the first machine learning model, a selected portion of the plurality of portions providing a first plurality of outputs in response; and generating a first seal using a one-way function, the plurality of inputs, and the first plurality of outputs, wherein the first seal is for being compared with a corresponding second seal of a second machine learning model to determine if the second machine learning model is a copy of the first machine learning model. The one-way function may include a hash function. Generating the first seal may include: applying the hash function to the plurality of inputs and the selected portion to produce the first seal; adding a date and time stamp to the first seal; and making the first seal unmodifiable. Making the first seal unmodifiable may further include publishing the first seal by inserting the first seal into a blockchain. Each portion of the plurality of portions may include one or more layers of the plurality of layers. The method may further include: dividing the second machine learning model into a second plurality of portions, wherein the second plurality of portions having a same number and size of portions as the first plurality of portions; inputting the plurality of inputs into the second machine learning model, a selected portion of the second plurality of portions providing a second plurality of outputs in response; generating the second seal using the one-way function, the plurality of inputs and the second plurality of outputs; and determining if the first seal and the second seal are the same.

In accordance with yet another embodiment, there is provided, a method for detecting copying of a machine learning model, the method including: providing a first machine learning model, wherein the first machine learning model includes a plurality of layers, each layer of the plurality of layers includes one or more nodes; dividing the first machine learning model into a first portion and a second portion; inputting a plurality of inputs into the first machine learning model, and in response, a selected one of the first or second portions providing a first plurality of intermediate outputs; inputting the plurality of inputs into a second machine learning model; comparing the first plurality of intermediate outputs of the selected one of the first or second portions of the first machine learning model to a second plurality of intermediate outputs from a corresponding selected portion of the second machine learning model; and determining if the first plurality of intermediate outputs and the corresponding plurality of intermediate outputs match. The method may further include publishing the first seal by inserting the first seal into a blockchain. The method may further include generating a first seal using a hash function, the plurality of inputs, and the first plurality of outputs, wherein the first seal is for being compared with a second seal generated from the second machine learning model to determine if the second machine learning model is a copy of the first machine learning model. The selected portion of the first and second plurality of portions may each include one or more nodes of one or more layers of the plurality of layers. The first machine learning model may be a classification type of machine learning model.

FIG. 1 illustrates ML model 10 in accordance with an embodiment. Machine learning model 10 is based on a neural network and includes a plurality of nodes organized as layers. In ML model 10, there is one input layer 13 including nodes 12, 14, 16, and 18, three hidden layers 15, 17, and 19 including nodes 20, 22, 24, 26, 28, 30, 32, 34, 36, 38, and 40, and an output layer 21 including nodes 42 and 44. Arrows between the nodes represent possible prediction paths that result from training ML model 10. Inputs labeled "INPUT" are provided to the input layer nodes 12, 14, 16, and 18 and output predictions OUTPUT are provided from nodes 42 and 44 of the output layer. The inputs may be any type of input such as images, music, text, or video. In some embodiments, the output predictions may be accompanied by confidence levels of the correctness of the output predictions.

Figure 2:
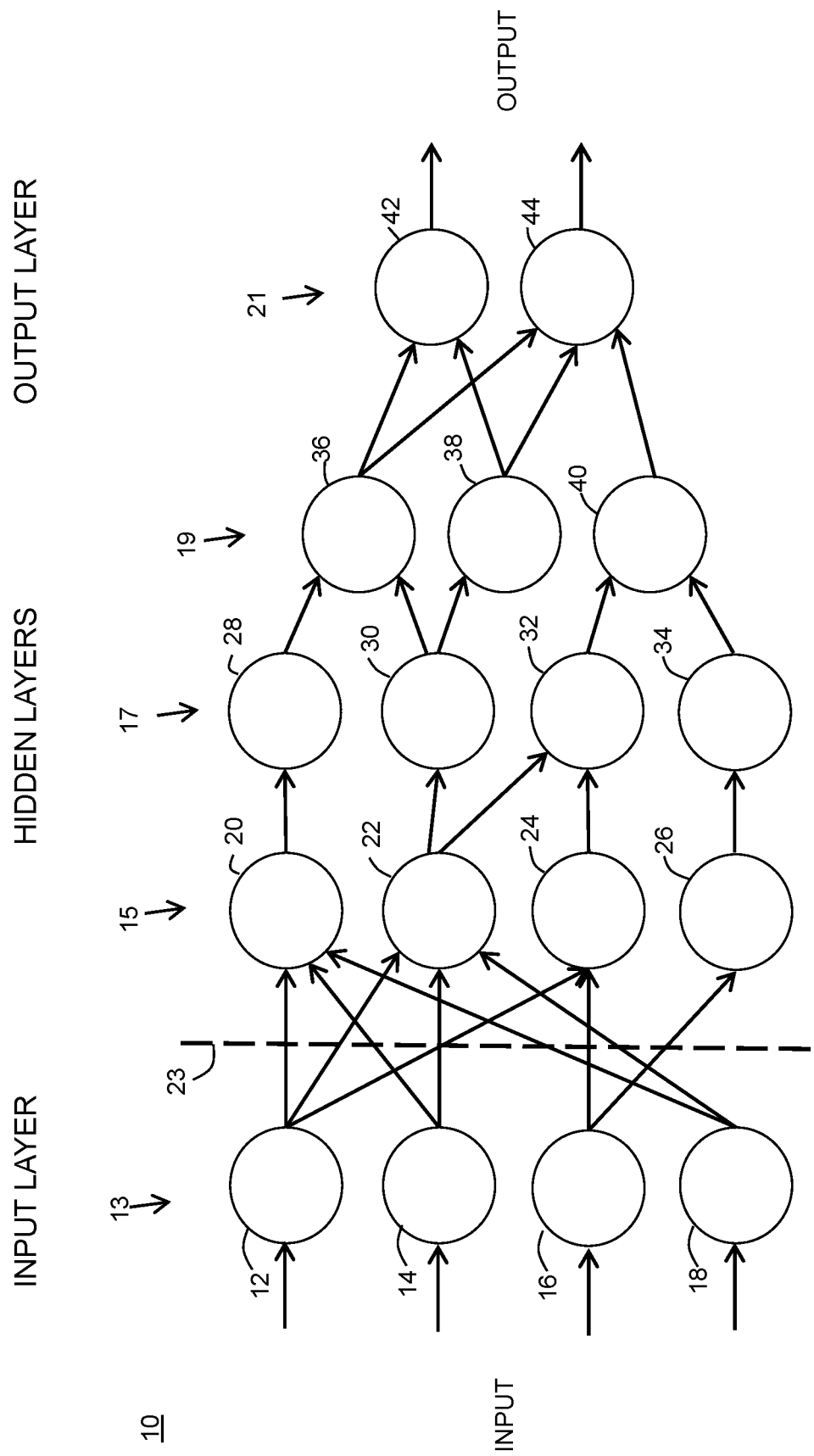
FIGS. 2-4 illustrate various other examples of ways to divide the ML model of FIG. 1.
Figure 3:
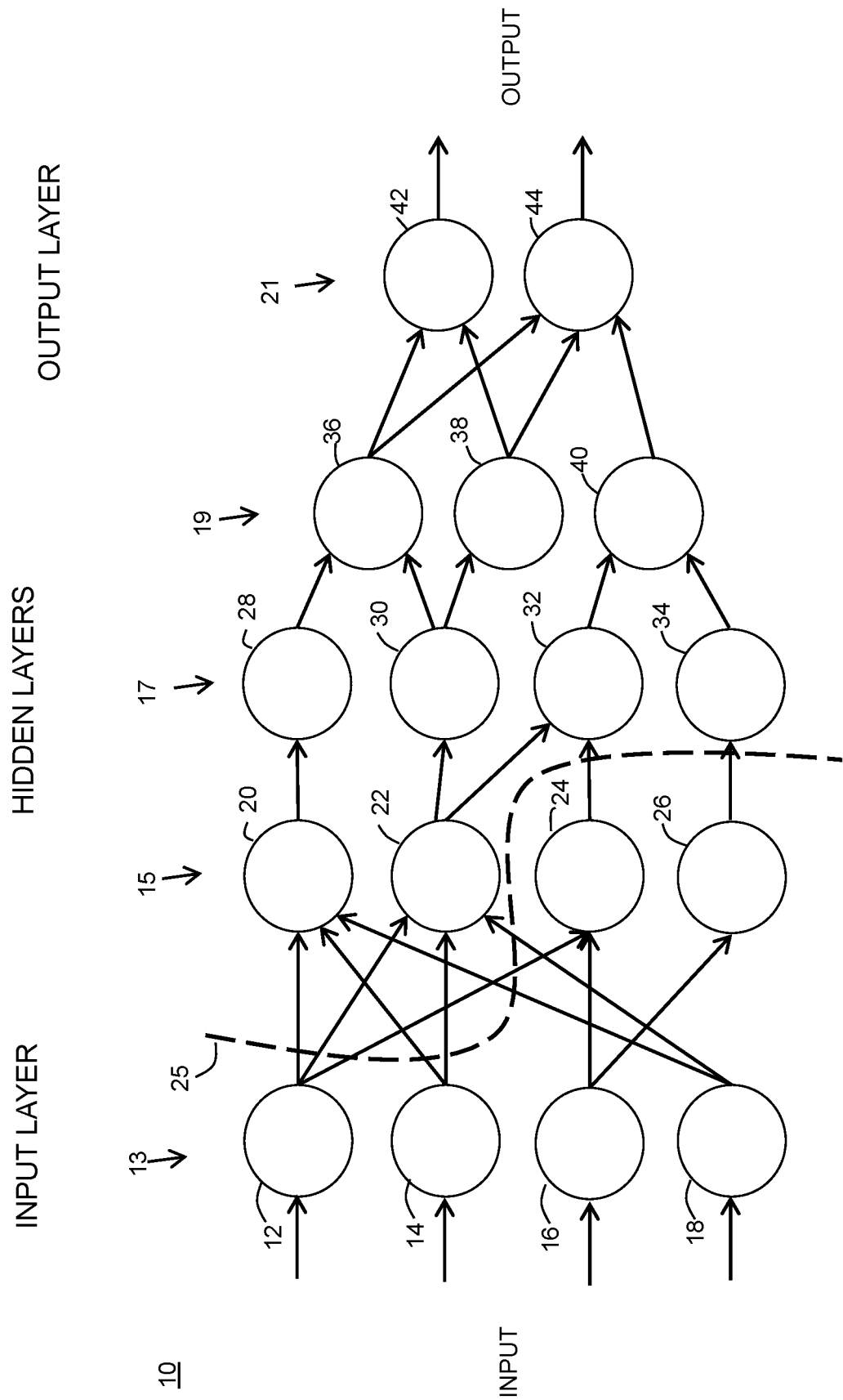
Figure 4:
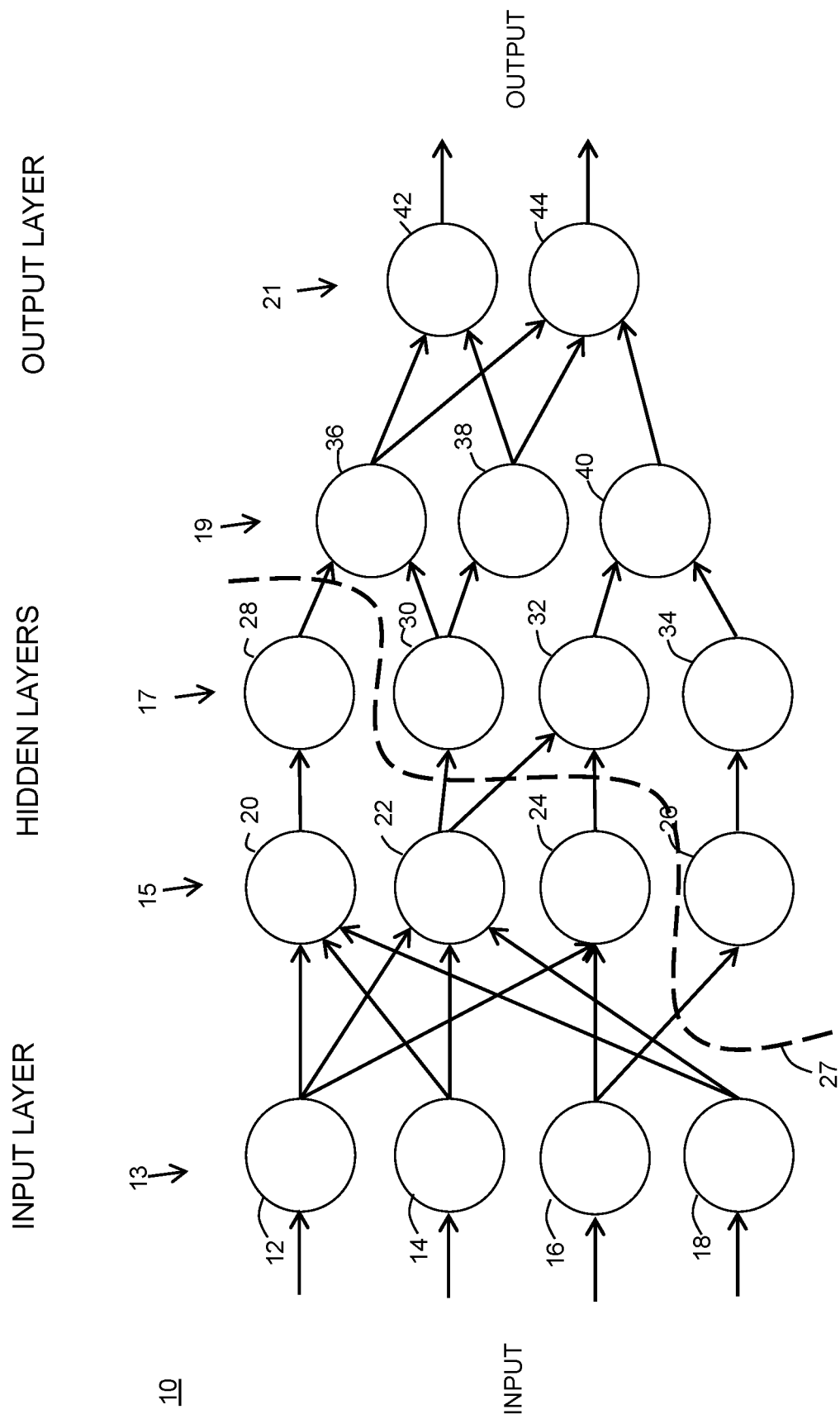

Machine learning model 10 is divided into multiple portions. A dashed line 11 in FIG. 1 illustrates one way ML model 10 may be divided. In FIG. 1, dashed line 11 is drawn between hidden layers 15 and 17 separating ML model 10 into a portion on the right side of dashed line 11 and a portion on the left side of dashed line 11. FIGS. 2-4 illustrate other possible ways ML model 10 may be divided.

Initially, a ML model is trained with training data. As an example, one well known training data set is the Pima-Indians-Diabetes data set. This training set has 768 records with 8 numeric attributes, and the objective is to decide whether a patient will suffer an onset of diabetes within 5 years of when the measurements were taken. A neural network can be trained with this data set and other data sets.

After training, the ML model is used for performing inference operations. Because training is time consuming and the training data sets may be expensive to obtain, the trained machine learning model can be very valuable. Also, the ML model may be proprietary and confidential to the owner. The herein disclosed method provides a way to detect an unauthorized copy of a ML model without disclosing the entire model. In the method, a predetermined input or plurality of inputs is provided to input layer 13 of ML model 10. Each node applies a weighted activation function and outputs an intermediate result. Each subsequent node then receives the intermediate result for a previous node, applies a weighted activation function and outputs another intermediate result to the next node. A final result is output from output layer 21, which may be a classification of the predetermined inputs provided to input layer 13. Machine learning model 10 is divided to two portions as indicated by dashed line 11. The location of dashed line 11 is not important and can be anywhere in ML model 10. Other possibilities are illustrated in FIGS. 2-4.

To determine if a ML model is a copy or a clone of ML model 10, intermediate outputs of hidden layer 15 are used. The intermediate outputs are outputs from the nodes of hidden layer 15 of the selected portion determined by dashed line 11. The outputs of hidden layer 15 are compared to the outputs of the same layer in the suspected copy or clone. If the outputs of hidden layer 15 match the outputs of a corresponding hidden layer 15 in a suspected copy, then the suspected copy may be an exact copy of ML model 10. However, if the outputs do not match, then the suspected copy may be a clone of ML model 10.

In one embodiment, a seal is created using the predetermined inputs and intermediate results from each of the nodes of a chosen one of the two portions determined by dashed line 11. In one embodiment, the portion on the right side of dashed line 11 is chosen for seal creation. To create the seal, a one-way function, such as a hash function is applied to a concatenation of the predetermined inputs and the intermediate results. The seal may include other information and may be time and date stamped. In one embodiment, the seal may be published, such as by providing the seal to a blockchain. Publishing the seal has the effect of making the seal unmodifiable after the date of publication.

The seal may be used to determine if another machine learning model is a copy of ML model 10. To use the seal, the suspected copy is divided the same way as ML model 10 when the seal for ML model 10 was created. Then, the same predetermined inputs are provided to the suspected copy, and a seal is created the same way as the seal of ML model 10. The two seals are compared to determine if they are the same. If the two seals are the same, then there is a high likelihood that the suspected copy is an actual copy of ML model 10. If the seals are not the same, then the suspected copy may be a clone of ML model 10.

FIGS. 2-4 provide other examples of ways ML model 10 may be divided into multiple portions. In FIG. 2, dashed line 23 may be drawn between any of the layers, for example, dashed line 23 is illustrated between layers 13 and 15. The portions do not have to include only whole layers. For example, in FIG. 3, dashed line 25 divides ML model 10 between nodes 12, 14, 16, 18, 24, and 26 in one portion and nodes 20, 22, 28, 30, 32, 34, 36, 38, 40, 42, and 44 in another portion. Similarly, in FIG. 4, dashed line 27 divides ML model 10 into one portion having layer 13, nodes 20, 22, and 24 of layer 15, and node 28 or layer 17, and another portion including nodes 30, 32, and 34 in layer 17, and layers 19 and 21.

Figure 5:
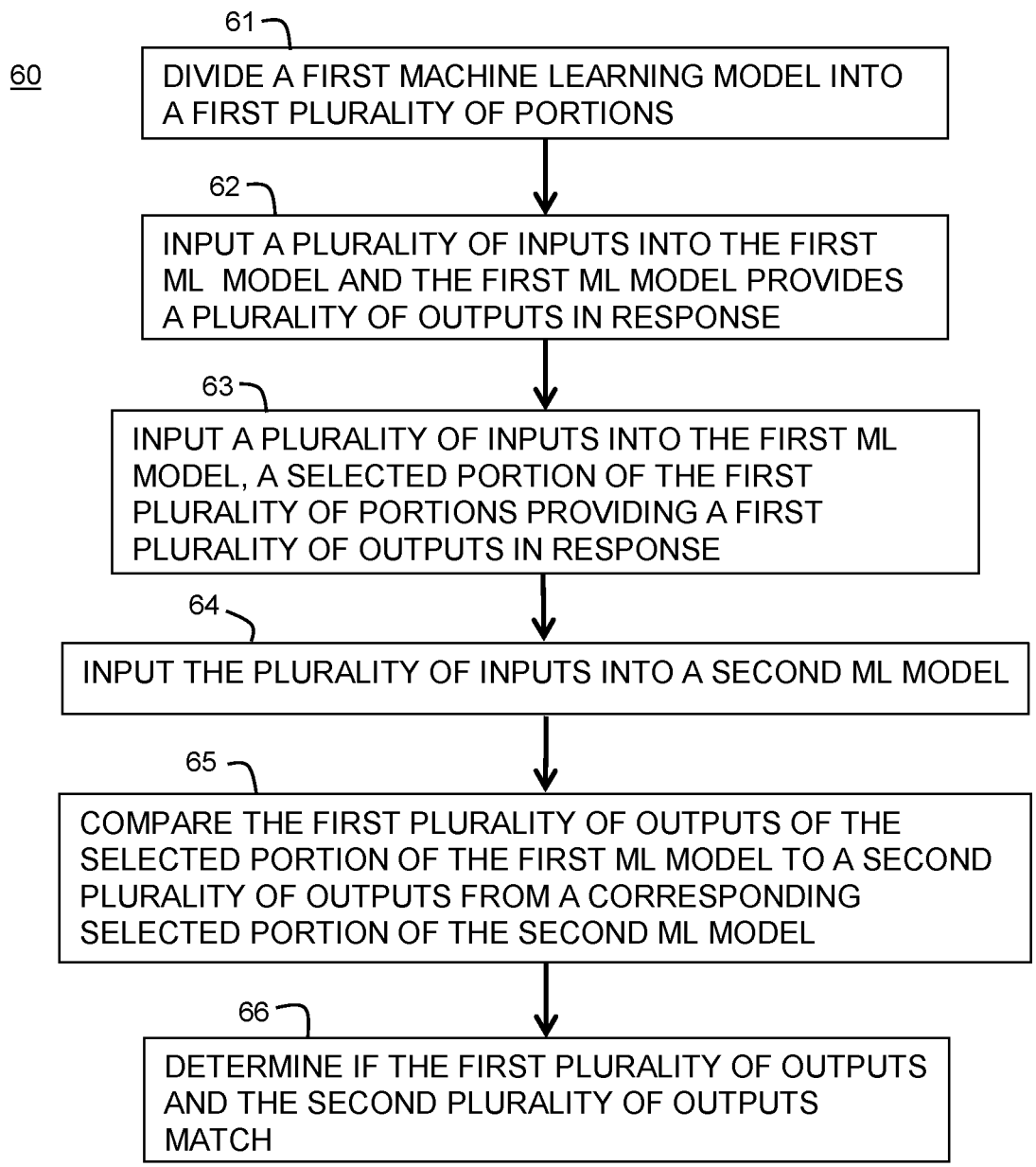
FIG. 5 illustrates a method for detecting copying of a machine learning model in accordance with an embodiment.

FIG. 5 illustrates method 60 for detecting copying of a machine learning model in accordance with an embodiment. Method 60 begins at step 61. At step 61, a first machine learning model is divided into a first plurality of portions. At step 62, a plurality of predetermined inputs is provided to the ML model during inference operation of the ML model. In response, a plurality of outputs is provided from the ML model. At step 63, the inputs are input into the first ML model, a selected portion of the first plurality of portion provide a first plurality of outputs in response. At step 64, input the plurality of inputs into a second ML model. At step 65, the first plurality of outputs of the selected portion of the first ML model are compared to a second plurality of outputs from a corresponding selected portion of the second ML model. At step 66, it is determined if the first plurality of outputs and the second plurality of outputs match. If they are not the same, then the second ML model may be a clone of the first ML model.

The disclosed method does not require any modification to the protected ML model, thus preserving accuracy of the ML model. Also, because the created seal is based on a portion of the ML model instead of the whole model, less of the ML model is made known to others, thus protecting the secrecy or confidentiality of the ML model. In addition, the method can be applied to various types of ML models and no retraining of the protected ML model is required.

FIG. 6 illustrates a data processing system 70 useful for implementing the machine learning model and method of FIG. 1. Data processing system 70 may be implemented on one or more integrated circuits and may be used in an implementation of the machine learning system in accordance with the described embodiments. Data processing system 70 includes bus 74. Connected to bus 74 is processor 76, memory 78, user interface 80, instruction memory 82, and network interface 84. Processor 76 may be any hardware device capable of executing instructions stored in memory 78 or instruction memory 82. For example, processor 76 may execute the machine learning algorithms using training data stored in memory 78. Processor 76 may have multiple processing cores. Processor 76 may be, for example, a microprocessor, field programmable gate array (FPGA), application-specific integrated circuit (ASIC), or similar device. Processor 76 may be implemented in a secure hardware element and may be tamper resistant.

Memory 78 may be any kind of memory, such as for example, L1, L2, or L3 cache or system memory. Memory 78 may include volatile memory such as static random-access memory (SRAM) or dynamic RAM (DRAM), or may include non-volatile memory such as flash memory, read only memory (ROM), or other volatile or non-volatile memory. Also, memory 78 may be implemented in a secure hardware element. Alternately, memory 78 may be a hard drive implemented externally to data processing system 70.

User interface 80 may be connected to one or more devices for enabling communication with a user such as an administrator. For example, user interface 80 may be enabled for coupling to a display, a mouse, a keyboard, or other input/output device. Network interface 84 may include one or more devices for enabling communication with other hardware devices. For example, network interface 84 may include, or be coupled to, a network interface card (NIC) configured to communicate according to the Ethernet protocol. Also, network interface 84 may implement a TCP/IP stack for communication according to the TCP/IP protocols. Various other hardware or configurations for communicating are available.

Instruction memory 82 may include one or more machine-readable storage media for storing instructions for execution by processor 76. In other embodiments, both memories 92 and 96 may also store data upon which processor 76 may operate. Memories 78 and 82 may store, for example, one or more machine learning models, or encryption, decryption, and verification applications. Memory 82 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting a copy of a machine learning model, the method comprising:
    providing a first machine learning model, wherein the first machine learning model includes a plurality of layers, wherein the plurality of layers includes an input layer, a plurality of hidden layers, and an output layer;
    dividing the first machine learning model into a first plurality of portions;
    inputting a plurality of inputs into the first machine learning model, a selected portion of the first plurality of portions providing a first plurality of intermediate outputs from one or more of the plurality of hidden layers in response;
    inputting the plurality of inputs into a second machine learning model;
    comparing the first plurality of intermediate outputs of the selected portion of the first plurality of portions of the first machine learning model to a second plurality of intermediate outputs from a corresponding selected portion of the second machine learning model; and
    determining if the first plurality of intermediate outputs and the second plurality of intermediate outputs match.

2. The method of claim 1, wherein the plurality of inputs is characterized as being a plurality of images, music, text, or a video.

3. The method of claim 1, further comprising:
    generating a first seal using the plurality of inputs and the first plurality of intermediate outputs;
    generating a second seal using the second plurality of inputs and the second plurality of intermediate outputs; and
    determining if the first seal and the second seal are the same.

4. The method of claim 1, wherein the first and second machine learning models are neural networks.

5. The method of claim 1, wherein the selected portions of the first and second plurality of portions each comprises one or more hidden layers of the plurality of hidden layers.

6. The method of claim 1, wherein the selected portions of the first and second plurality of portions each comprise one or more nodes of one or more hidden layers of the plurality of layers.

7. The method of claim 1, further comprising:
    applying a one-way function to the plurality of inputs and the first plurality of intermediate outputs to produce a seal;
    adding a date and time stamp to the seal; and
    making the seal unmodifiable.

8. The method of claim 7, wherein making the seal unmodifiable further comprises inserting the first seal into a blockchain.

9. The method of claim 1, wherein the first machine learning model is a classification type of machine learning model.

10. A method for detecting copying of a machine learning model, the method comprising:
    providing a first machine learning model, wherein the first machine learning model includes a plurality of layers, each layer of the plurality of layers includes one or more nodes, and wherein the plurality of layers includes an input layer, a plurality of hidden layers, and an output layer;
    dividing the first machine learning model into a first plurality of portions;
    inputting a plurality of inputs into the first machine learning model, a selected portion of the plurality of portions providing a first plurality of intermediate outputs from one or more hidden layer of the plurality of hidden layers in response; and
    generating a first seal using a one-way function, the plurality of inputs, and the first plurality of intermediate outputs, wherein the first seal is for being compared with a corresponding second seal of a second machine learning model to determine if the second machine learning model is a copy of the first machine learning model.

11. The method of claim 10, wherein the one-way function comprises a hash function.

12. The method of claim 11, wherein generating the first seal comprises:
    applying the hash function to the plurality of inputs and the selected portion to produce the first seal;
    adding a date and time stamp to the first seal; and
    making the first seal unmodifiable.

13. The method of claim 12, wherein making the first seal unmodifiable further comprises publishing the first seal by inserting the first seal into a blockchain.

14. The method of claim 10, wherein each portion of the plurality of portions comprises one or more layers of the plurality of hidden layers.

15. The method of claim 10, further comprising:
    dividing the second machine learning model into a second plurality of portions, wherein the second plurality of portions having a same number and size of portions as the first plurality of portions;
    inputting the plurality of inputs into the second machine learning model, a selected portion of the second plurality of portions providing a second plurality of intermediate outputs in response;
    generating the second seal using the one-way function, the plurality of inputs and the second plurality of intermediate outputs; and determining if the first seal and the second seal are the same.

16. A method for detecting copying of a machine learning model, the method comprising:
- providing a first machine learning model, wherein the first machine learning model includes a plurality of layers, each layer of the plurality of layers includes one or more nodes, and wherein the plurality of layers includes an input layer, a plurality of hidden layers, and an output layer;
- dividing the first machine learning model into a first portion and a second portion, wherein the first portion includes the input layer and nodes from one or more of the plurality of hidden layers, and wherein the second portion includes the remaining nodes of the plurality of hidden layers and the output layer;
- inputting a plurality of inputs into the first machine learning model, and in response, the first portion providing a first plurality of intermediate outputs;
- inputting the plurality of inputs into a second machine learning model;
- comparing the first plurality of intermediate outputs of the first portion of the first machine learning model to a second plurality of intermediate outputs from a corresponding portion of the second machine learning model; and
- determining if the first plurality of intermediate outputs and the second plurality of intermediate outputs match.

17. The method of claim 16, further comprises:
- generating a first seal using the plurality of inputs and the first plurality of intermediate outputs;
- generating a second seal using the second plurality of inputs and the second plurality of intermediate outputs; and
- determining if the first seal and the second seal are the same.

18. The method of claim 16, further comprising generating a first seal using a hash function, the plurality of inputs, and the first plurality of intermediate outputs, wherein the first seal is for being compared with a second seal generated from the second machine learning model to determine if the second machine learning model is a copy of the first machine learning model.

19. The method of claim 18, wherein the first seal is used to detect a copy of the first machine learning model by first dividing the first machine learning model the same way as the first machine learning model was divided to create the first seal.

20. The method of claim 16, wherein the first machine learning model is a classification type of machine learning model.

* * * * *